United States Patent [19]

Cohen

[11] Patent Number: 5,113,177
[45] Date of Patent: May 12, 1992

[54] APPARATUS FOR A DISPLAY SYSTEM

[75] Inventor: Ricard L. Cohen, Matawan

[73] Assignee: Allied-Signal Inc., Morris Township, Morris County, N.J.

[21] Appl. No.: 253,175

[22] Filed: Oct. 4, 1988

[51] Int. Cl.$^5$ .............................................. G09G 3/02
[52] U.S. Cl. .................................... 340/705; 340/980; 359/630
[58] Field of Search .................. 340/105, 980; 353/13, 353/14; 358/103, 104, 93, 250, 211, 225, 148, 183; 350/174, 145, 538; 250/213 VT

[56] References Cited

U.S. PATENT DOCUMENTS

| | | | |
|---|---|---|---|
| 4,000,419 | 12/1976 | Crost et al. | 350/538 |
| 4,449,787 | 5/1984 | Burbo et al. | 340/705 |
| 4,575,722 | 3/1986 | Anderson | 340/705 |
| 4,642,452 | 2/1987 | Loy | 250/213 VT |
| 4,743,200 | 5/1988 | Welch et al. | 340/705 |
| 4,755,664 | 7/1988 | Holmes et al. | 340/705 |
| 4,792,673 | 12/1988 | Blackler | 250/213 VT |
| 4,898,046 | 10/1989 | Smith | 340/980 |
| 4,903,136 | 2/1990 | Iketani | 358/225 |
| 4,907,083 | 3/1990 | Claude et al. | 358/183 |
| 5,012,342 | 4/1991 | Olsen et al. | 358/183 |

FOREIGN PATENT DOCUMENTS

| | | | |
|---|---|---|---|
| 1527049 | 10/1978 | United Kingdom | 340/980 |
| 8504758 | 10/1985 | World Int. Prop. O. | 250/213 VT |

OTHER PUBLICATIONS

Greeley, Jr.; "Navy, USMC Push Development of Night-attack Capability"; Aviation and Space Technology; Jul. 7, 1986; p. 98.

Primary Examiner—Ulysses Weldon
Assistant Examiner—M. Fatahiyar
Attorney, Agent, or Firm—Donald B. Paschburg; Howard G. Massung; Robert A. Walsh

[57] ABSTRACT

A display system for enabling a pilot in an aircraft to simultaneously view an image of selected display information and a scene external to the aircraft during low visibility conditions, such as the night-time, is provided. An image intensifier tube is mounted on the side of a pilot's helmet, preferably a Helmet Display system, so that the image sensed coincides with the pilot's field of view. The image intensifier tube intensifies light from the external scene and outputs voltages representative of the scene to a converter. The output voltage is converted to a video signal having a format which is compatible to the display system in use. A Combining Circuit combines the compatible video signal with video signals from other display sources, such as instrumentation panel displays. The combined electrical signals are input to a display driver which drives the display system to cause the selected display information to be superimposed on the external scene viewed by the pilot.

5 Claims, 2 Drawing Sheets

APPARATUS FOR A DISPLAY SYSTEM

FIELD OF THE INVENTION

This invention relates to display systems that enable simultaneous viewing of multiple images from different sources. More specifically, it relates to display systems that present simultaneous images of selected display information from a vehicle and images of scenes external to the vehicle during low visibility conditions, such as the night time, for viewing by a pilot.

BACKGROUND OF THE INVENTION

Instrumentation displays in aircraft have been predominately incorporated into panel displays. A pilot flying an aircraft with such displays has to look down from a scene external to the aircraft to the panel to view instrumentation displays and, therefore, can not simultaneously view the external scene as well as the panel instrumentation displays. Furthermore, even if simultaneous viewing were possible, the external scene and the panel displays are at different focal lengths from the pilot. A pilot would have to refocus to read the displays after observing the external scene or to observe the external scene after reading the displays and could not, therefore, simultaneously interpret the displays and the external scene.

As a result, Head Up Displays (HUDs) were developed so that a pilot could simultaneously view an image of selected display information and an external scene through a window, without having to refocus. The HUDs utilize a lens to collimate light rays from an image of the selected display information so that the light rays appear to be projected from a location distant from the pilot. That image is superimposed on the view of an external scene the pilot has through a fixed window, thereby allowing simultaneous viewing of the selected display information overlaying the external scene without requiring the pilot to refocus. HUDs, however, only provide the pilot with a fixed, limited field of view as defined by the fixed window.

In a further development, Helmet Display systems allow simultaneous viewing of selected display information and an external scene corresponding to the pilot's field of view. In some systems, the visor on the pilot's helmet acts as a holographic collimating combiner. The pilot views an external scene through his visor and the image of the selected display information is superimposed on the visor. Systems which allow simultaneous viewing of selected display information and the external flight environment during good visibility conditions, therefore, are known.

During low visibility conditions, such as the night-time, however, such systems are not yet available. Currently, during such conditions, Night Vision Goggles are placed in front of the eyes of the pilot to intensify the light from a low visibility scene external to the aircraft, allowing a pilot to view the scene directly and superimposed over the dim visual scene. The goggles, however, can not be used with existing helmet display systems because they do not fit into the limited space between the pilot's eye and the helmet display visor. A system which allows a pilot to simultaneously view combined images of display information and external flight environment during low visibility conditions, therefore, is needed.

SUMMARY OF THE INVENTION

In accordance with the invention there is provided a display system that allows a pilot in an aircraft to simultaneously view an image of selected display information and a scene external to the aircraft during low visibility conditions, such as the night-time. The display system comprises an image intensifier tube, means for converting a voltage output from the image intensifier tube to a first video signal, means for combining the first video signal with video signals from other sources and a display driver for effecting the display of the combined video signal on the display system.

The image intensifier tube is mounted on a pilot's helmet, away from the pilot's field of view, so as to collect light from a scene external to the aircraft corresponding to the pilot's field of view. The tube intensifies the collected light to provide low visibility vision. It can be constructed by modifying existing Night Vision Goggles, currently used by pilots for low visibility vision, by removing the eyepiece used for direct vision. A CCD Sensor, having a plurality of photosites, replaces the eyepiece and receives an intensified signal to provide an output of sequential voltages representative of the external scene.

The sequential voltages are scanned by the means for converting and converted to a first video signal. In accordance with a preferred embodiment, this signal is compatible with IEEE STD RS-170, so that the first video signal can be combined with other video signals and displayed on existing Helmet Display systems.

The first video signal is output to the means for combining video signals, where it can be combined with other video signals to form a combined video signal. The other video signals represent selected display information, for example, from navigation system displays, weapon system displays, and electro-optic displays such as FLIR (Forward Looking Intra Red).

The combined video signals are output to a display driver unit which drives a display, causing the combined video image to be displayed to the pilot. The display can be a Helmet Display system, or any other display system, however, the invention is particularly useful with existing helmet display systems, as they can not accommodate existing Night Vision Goggles.

DESCRIPTION OF THE PREFERRED EMBODIMENT

Figure 1:
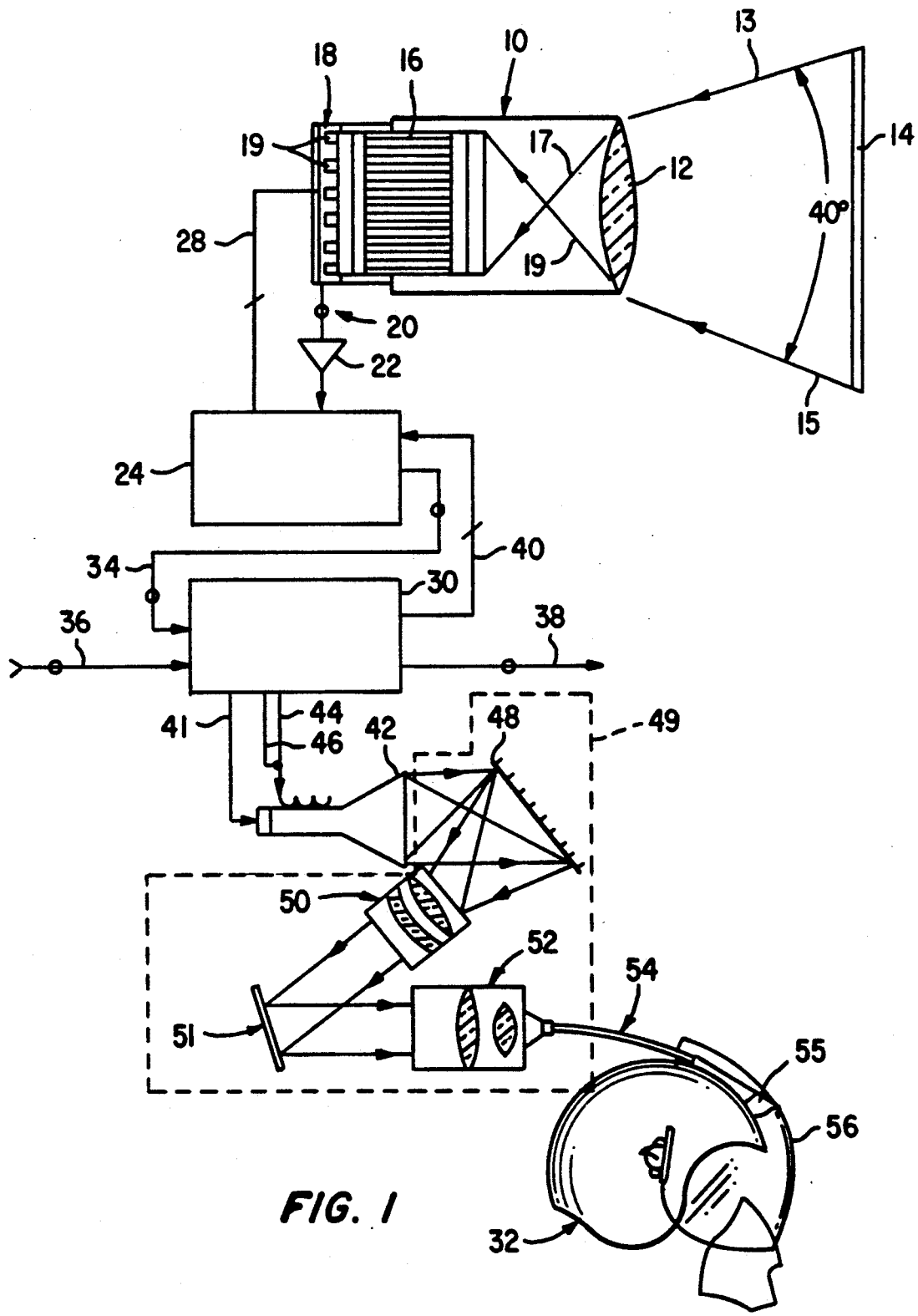
FIG. 1 illustrates a block diagram of the preferred embodiment of the display system.

FIG. 1 illustrates a block diagram of a preferred embodiment of the present invention which provides a pilot in an aircraft with a simultaneous view on a display of an image of selected display information and of an image of a scene external to the aircraft during low visibility conditions, such as the night-time. An Image Intensifier Tube 10 collects light from the external scene 14 and intensifies that light so as to provide a video signal for display by a Helmet Display system 32.

The Image Intensifier Tube 10 has an objective lens 12 mounted at its input for collecting light from the external scene 14. The lens 12 typically provides a 40° field of vision of the external scene 14, as indicated by lines 13 and 15. The Image Intensifier Tube 10 also has an internally mounted intensifier 16 which comprises a sensitive cathode, a microchannel multiplier, a phosphor screen and a fiber optic twister.

The objective lens 12 passes the light collected from the external scene 14 to the sensitive cathode, inverting the image of the scene 14 while doing so, as indicated by lines 17 and 19. The sensitive cathode generates electrons at each point where it receives light from the scene 14, the quantity of electrons generated being related to the quantity of light received.

The electrons generated by each output of the sensitive cathode are input to the microchannel multiplier, where they are amplified. The amplified electron flow from the microchannel multiplier strikes the phosphor screen, where light representing an inverted image of the low visibility scene 14 is generated. This light is passed through a fiber optic twister to reinvert the inverted image of the low visibility scene 14, so that the scene 14 can be normally viewed by a pilot.

The Image Intensifier Tube 10 further comprises a CCD Sensor 18 which is placed at the output of the fiber optic twister. The CCD Sensor 18 has a plurality of photosites 19 each of which accumulate charge based on the quantity of light to which is exposed. During operation, the CCD Sensor 18 is exposed to light from the Fiber Optic Twister for a given time, allowing each photosite 19 to accumulate a charge representative of the light from a corresponding point in the external scene 14. The random generation of charges in the CCD Sensor 18 is determined at the same time by a plurality of shielded elements and factored into the accumulated charges to correct for the random generation of electrons or the so-called dark signal.

After the plurality of photosites in the CCD Sensor 18 have been exposed to the intensified light from the external scene 14 for a suitable time, typically, 100 us to 100 ms, the charge accumulated by each photosite is sequentially transferred to an output circuit. The charge from a given photosite changes the voltage across a precharged diode. The changed voltage is amplified, sampled, held and output on the wire 20. After output, the diode is recharged to a given level and the process is repeated for each photosite 19 charge, so that a sequential voltage representative of the scene 14 is output from the Image Intensifier Tube 10.

CCD Sensors 18 having 3456 photosites and data output rates up to 20 MHz are available. See, for example, product number CCD142, manufactured by Fairchild, which has 2048 photsites and an output rate of 2 MHz.

The Image Intensifier Tube 10, therefore, serves to intensify whatever light is collected from the external scene 14, so as to enable an image of the scene 14 to be eventually displayed. Such an Image Intensifier Tube 10 is easily constructed in accordance with a preferred embodiment of the invention by modifying existing Night Vision Goggles, for example, product number VNVA-310 manufactured by Varian. These Goggles have a light intensifying tube therein and are currently used by pilots during low visibility conditions, such as the night-time, to intensify light so as to provide a pilot with a direct view of the low visibility scene 14. The light intensifying tube from the Night Vision Goggles comprises most of the same elements as the Image Intensifier Tube 10 of the present invention. The only modification necessary to construct the Image Intensifier Tube 10 from existing Night Vision Goggles, is the removal of the light intensifying tube, the removal of the eyepiece from the light intensifying tube which is used for direct vision of the scene by the pilot, and the addition of the CCD Sensor 18 in its place. The CCD Sensor 18 should be placed as close to the Fiber Optic Twister as possible.

The above described modification of the Night Vision Goggles is merely one way to implement the Image Intensifier Tube 10. Any optical system having an objective lens to collect light and having electro-optical devices to intensify the collected light can also be used.

A Signal Converting Circuit 24 receives the sequential voltages output by the CCD Sensor 18 on line 20 through buffer 22. Scan lines 28, are provided, as needed, from the Signal Converting Circuit 24 to the CCD Sensor 18 to control the output rate of the CCD Sensor 18.

The Signal Converting Circuit 24 converts the voltages from the CCD Sensor 18 to a video signal having a desired format which is compatible for display on the display system in use.

In accordance with a preferred embodiment, the format of the video signal output of the Signal Converting Circuit 24 is IEEE STD RS-170, which is the monochromatic ·525 line, closed circuit television standard. The required circuitry for the Signal Converting Circuit 24 to generate the IEEE STD RS-170 compatible signal is well known in the art. Such circuitry is currently used, for example, in Video Cassette Recording cameras and camcorders currently on the market. Any desired format, however, can be generated to accomodate the particular display system in use merely by changing the Signal Converting Circuit 24.

A Combining Circuit 30 receives the first video signal on a wire 34 from the Signal Converting Circuit 24. The Combining Circuit 30 also receives video signals from other sources on wires 36 and combines them with the video signal received on wire 34 to form a combined video signal for display on the Helmet Display system 32. The other video signals on wires 36 represent selected display information and can come from any of the aircraft systems, for example, navigation systems or weapons systems and can be transmitted on either a dedicated bus or on a standard aircraft bus, such as MIL-STD-1553 bus. The combined video signal from the Combining Circuit 30 can be output on a plurality of wires 38 to drive displays other than the Helmet Display 32.

A synchronization signal is provided on wire 40 to synchronize the display system. By this signal, the Combining Circuit 30 instructs the Signal Converting Circuit 24 to scan the next sequential voltage output from the CCD Sensor 18 to convert the voltage to a signal having a RS-170 format. The synchronization line 40, therefore, ensures that the Signal Converting Circuit 24 has generated a video signal from the voltage output by the CCD Imager 18, in time for the Combining Circuit 30 to provide a combined video signal on wire 41 for display at the correct time.

The Combining Circuit 30 outputs the combined video signal on wire 41 to a display driving circuit, which comprises a CRT 42, a first relay lens system 49, a fiber optic conduit 54 and a second relay lens system 55. The Combining Circuit 30 also provides deflection voltages for the CRT 42 on lines 44 and 46. The relay lens system 49 is provided to transmit the image from the CRT 42 onto the fiber optic conduit 54. In a preferred embodiment, the first relay lens system 49 includes a turning mirror 48, a collimating lens 50, a wavelength multiplexer holographic defraction grating 51 and an image guide 52. These components demagnify and reimage the CRT 42 output so as to transmit the combined video output onto the fiber optic conduit 54. Although a specific relay lens system 49 is shown, any such system which demagnifies and reimages the CRT 42 output to place the output on the fiber 54 can be used.

At the output of the fiber optic conduit 54, a second relay lens system 55 is provided. This lens system 55 reimages the combined images into the focus of the holographic collimating combiner 56.

Figure 2:
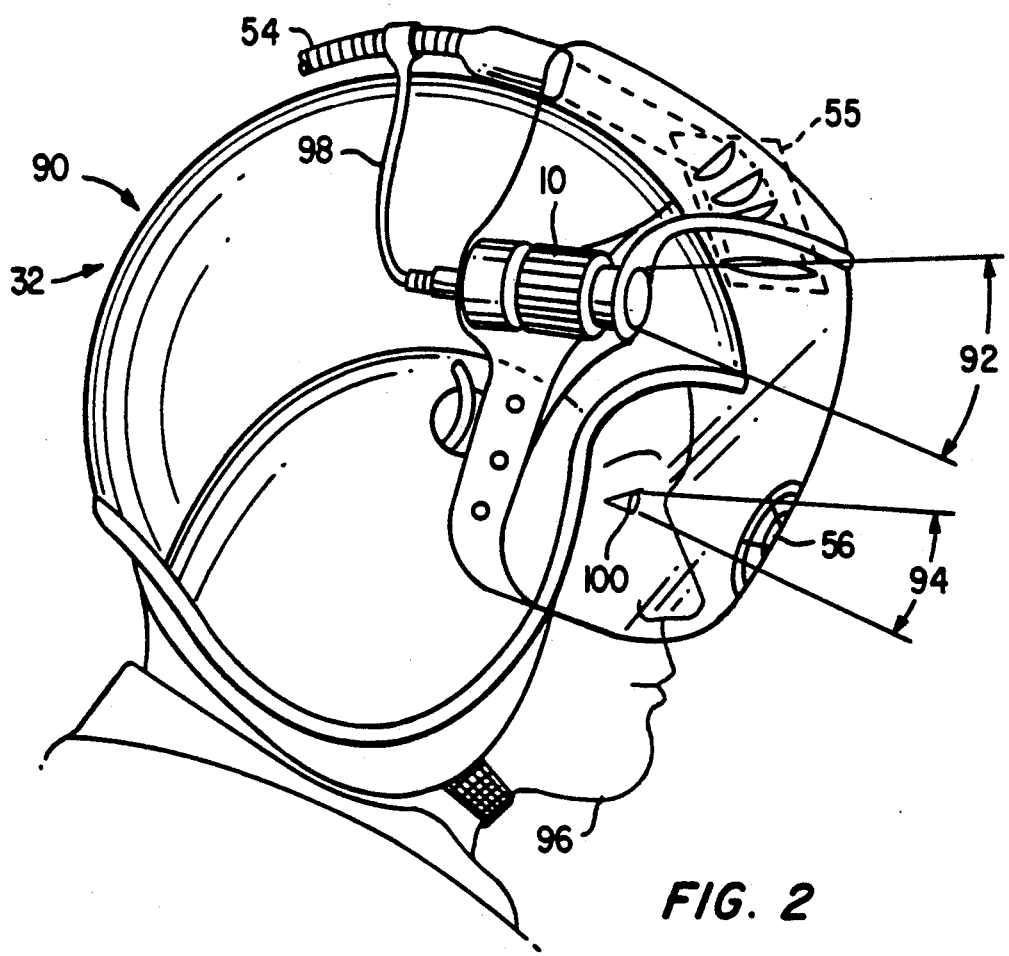
FIG. 2 illustrates a side view of the mounting of the Image Intensifier Tube on a Helmet Display system, in accordance with a preferred embodiment of the invention.
Figure 3:
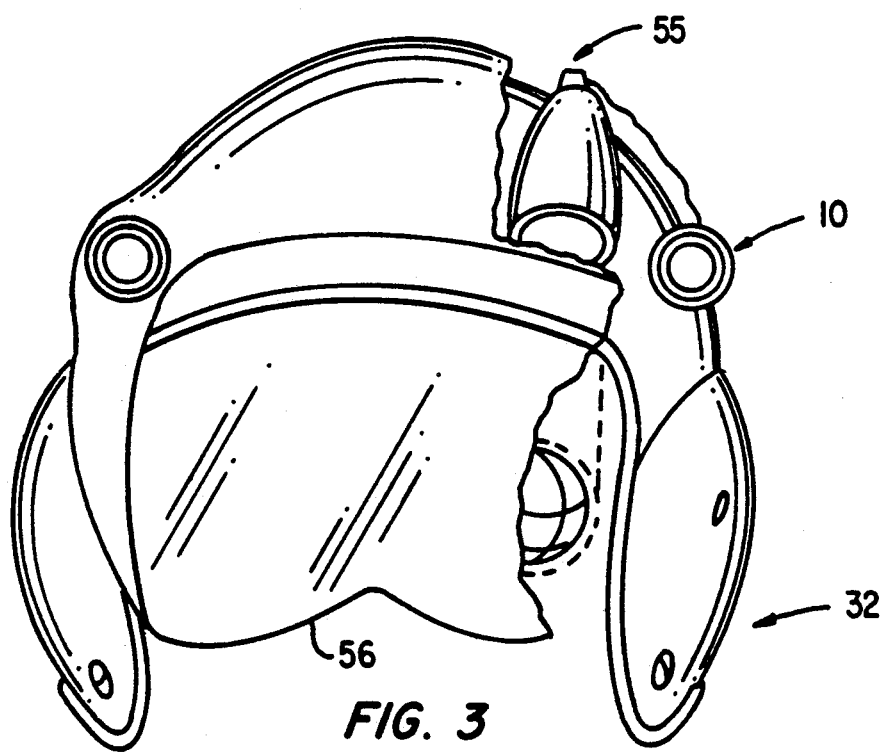
FIG. 3 illustrates a front view of the mounting of the Image Intensifier Tube as in FIG. 2, in accordance with a preferred embodiment of the invention.

FIGS. 2 and 3 illustrate a side view and a front view, respectively, of the Image Intensifier Tube 10 mounted on the side of the pilot's helmet 90 in a Helmet Display System 32 in accordance with a preferred embodiment of the invention. The mounting is such that the field of view 92 sensed by the Image Intensifier Tube 10 coincides with the field of view 94 sensed by the pilot 96 when looking forward through the holographic collimating combiner 56.

The cable bundle 98 carries wire 20 to the buffer 22 and the scanning lines 28 from the Signal Converting Circuit 24. The buffer 22 and the Signal Converting Circuit 24, along with the other electrical and optical components in FIG. 1 are housed in a component rack away from the helmet 90 so as to keep the helmet assembly 90 light.

Referring to FIG. 3, the space between the pilot's eye 100 and the visor 56 in a Helmet Display system 32 is limited. Existing Night Vision Goggles will not fit into this limited space, so that Helmet Display systems can not accommodate low visibility vision with Night Vision Goggles. The modification of existing Night Vision Goggles with the addition of a CCD Sensor 18 or the use of any other optical intensifying system having an electrical output, along with appropriate signal converting, combining and driving circuits, allows the side mounting on the helmet 90 and gives Helmet Display Systems 32 low visibility vision capability.

The invention has been illustrated as a monocular display system. It may also be implemented as a binocular system by duplicating the components of FIG. 1. A binocular system is particularly advantageous because of the extended field of view and redundacy provided. Such a system would also solve some dominant eye problems.

The invention has been illustrated for use with existing helmet display systems 32, however, it is not limited to use with such display systems. The invention may also be used with other display system. To do so, the Image Intensifier Tube 10 voltage output is converted into a video signal which is compatible with the existing display by the Signal Converter Circuit 24. Anticipated display systems include Helmet Display Systems such as IHADSS manufactured by Honeywell and in use on the AH-64A Attack Helicopter and the HITADS manufactured by the Bendix Corporation.

I claim:

1. Apparatus for use by a pilot in an aircraft for simultaneous viewing on a display of an image of a scene external to the aircraft and of an image of selected display information, said display being a helmet display having a visor on a helmet, said visor acting as a collimating combiner, comprising:
    (a) collecting means mounted on said helmet and collecting light from an external field of view which coincides with the pilot's field of view without interfering with said pilot's field of view for collecting and intensifying light from the external scene and providing a voltage on an output representative of the external scene, said collecting means being an image intensifying tube which is a light intensifying tube from a night vision goggle modified by removing an eyepiece and adding a CCD sensor, said image intensifying tube including (1) an objective lens which collects light from said external scene and forms an inverted image, (2) electron generating means for generating an electron flow, at a plurality of points in said inverted image, as a function of light collected by said objective lens, (3) amplifying means for multiplying said electron flows to generate an amplified electron flow at each of said points, (4) light generating means for generating light from each of said amplified electron flows, (5) the CCD sensor receiving light from said light generating means and having a plurality of photosites, each photosite generating a charge dependent on said photosite's exposure to light, and (6) inverting means for reinverting said inverted image disposed between said light generating means and said CCD sensor, for receiving light from said light generating means and outputting a reinverted image to said CCD sensor,
    (b) converting means for converting said voltage to a first video signal,
    (c) means for providing at least a second video signal,
    (d) combining means for combining said first and second video signals and for providing a combined video signal,
    (e) driving means responsive to said combined video signal for driving the display, and
    (f) synchronizing means for synchronizing the display so that said converting means converts said voltage to a first video signal for combining with said second video signal by said combining means in time for said driving means to be responsive to said combined signal.

2. Apparatus as claimed in claim 1, wherein said combining means has a plurality of inputs to accept a plurality of display signals and a plurality of outputs to drive a plurality of displays.

3. Apparatus as claimed in claim 1, wherein said driving means comprises:
    (a) a CRT,
    (b) a first relay lens system,
    (c) a fiber optic conduit, and
    (d) a second relay lens system.

4. Display apparatus for displaying images of a scene external to an aircraft and selected display information comprising:
    (a) an image intensifying tube of the type including a light intensifying tube from a night vision goggle modified by removing an eyepiece and adding a CCD sensor and which collects and intensifies light from the external scene and generates a corresponding voltage, said image intensifying tube including (1) an objective lens which collects light from said external scene and forms an inverted image, (2) a sensitive cathode which generates an electron flow at a plurality of points in said inverted image, said electron flows being dependent on light collected by said objective lens, (3) a microchannel multiplier which generates an amplified electron flow at each of said plurality of points, (4) a phosphor screen which generates light from each of said amplified electron flows, (5) the CCD sensor having a plurality of photosites, each photosite generating a charge dependent on said photosite's exposure to light, and (6) fiber optic twister means for reinverting said inverted image disposed between said phosphor screen and said CCD sensor for receiving light from said light generating means and outputting a reinverted image to said CCD sensor, (b) converting means for converting said voltage to a first video signal, (c) means for providing at least a second video signal, (d) combining means for combining said first video signal with said second video signal to form a combined video signal, (e) driving means responsive to said combined video signal for driving said display, and (f) synchronizing means for synchronizing the display so that said converting means converts said voltage to a first video signal for combining with said second video signal by said combining means in time for said driving means to be responsive to said combined signal.

5. Apparatus as claimed in claim 4, wherein said driving means comprises:

(a) a CRT,
(b) a first relay lens system,
(c) a fiber optic conduit, and
(d) a second relay lens system.

* * * * *